United States Patent [19]

Lenoir

[11] Patent Number: 4,577,092

[45] Date of Patent: Mar. 18, 1986

[54] INFRARED COOKING APPARATUS WITH ADJUSTABLE HEIGHT AND PIVOTAL HEATING ELEMENT AND WITH PIVOTAL SIDE FLAPS

[76] Inventor: Jacques A. Lenoir, St. Hubert, 1 bis Alle de Quebec, 91300 Massy, France

[21] Appl. No.: 501,115

[22] Filed: Jun. 6, 1983

[30] Foreign Application Priority Data

Jun. 7, 1982 [FR] France ............................. 82 09866

[51] Int. Cl.[4] ........................ H05B 1/00; A47J 37/00
[52] U.S. Cl. ................................. 219/354; 211/101; 211/193; 219/348; 219/357; 248/242
[58] Field of Search ........ 219/345, 348, 347, 352–354, 219/357, 405, 411, 454, 455, 458, 459, 463; 126/41 R; 248/204.4, 241, 242, 297; 211/101, 193, 208

[56] References Cited

U.S. PATENT DOCUMENTS

| 1,006,361 | 10/1911 | Daly ............................ 248/241 |
| 2,055,972 | 9/1936 | Fritsche ....................... 219/454 |
| 2,255,466 | 9/1941 | Jenkins ........................ 219/348 |
| 2,631,216 | 3/1953 | Ames ........................... 219/348 |
| 2,844,702 | 7/1958 | Staats .......................... 219/405 |
| 2,848,592 | 8/1958 | Mergen ........................ 99/390 |
| 2,868,111 | 1/1959 | Laskowski ................... 126/41 X |
| 2,995,257 | 8/1961 | D'anka ........................ 211/208 |
| 3,236,998 | 2/1966 | Wertheimer et al. ........ 219/405 |
| 3,267,925 | 8/1966 | Oatley .......................... 126/41 R |
| 3,358,585 | 12/1967 | Scherer ....................... 219/347 |
| 3,732,803 | 5/1973 | Buxmann ..................... 219/348 |
| 4,020,323 | 4/1977 | Dills ............................. 219/405 |
| 4,250,815 | 2/1981 | Swanson ...................... 211/193 |
| 4,444,323 | 4/1984 | Travis .......................... 211/193 |
| 4,470,512 | 9/1984 | Buffington et al. .......... 248/242 |

FOREIGN PATENT DOCUMENTS

| 1176334 | 8/1964 | Fed. Rep. of Germany ...... 219/454 |
| 2117185 | 5/1973 | Fed. Rep. of Germany ...... 219/411 |
| 2734332 | 2/1979 | Fed. Rep. of Germany .... 126/41 R |
| 544376 | 6/1956 | Italy ............................... 219/347 |
| 224604 | 3/1943 | Switzerland ................... 219/454 |
| 783533 | 9/1957 | United Kingdom . |

*Primary Examiner*—C. L. Albritton
*Assistant Examiner*—Geoffrey S. Evans
*Attorney, Agent, or Firm*—Murray Schaffer

[57] ABSTRACT

A cooking device, having a base on which a pan or the like may rest; vertical standard collapsibly secured to the base; and a housing removably mounted on the standard for holding a heating element horizontally in opposition to the base; the housing is provided with a removable concave cover and removable flaps depending lengthwise from its sides to enclose the space between the heating element and the base, preventing the escape or splattering of food, juices, fats, and concentrating the heat inwardly thereof.

7 Claims, 4 Drawing Figures

INFRARED COOKING APPARATUS WITH ADJUSTABLE HEIGHT AND PIVOTAL HEATING ELEMENT AND WITH PIVOTAL SIDE FLAPS

BACKGROUND OF THE INVENTION

The present invention relates to a portable apparatus for cooking foods and particular to a light weight portable and collapsible electric broiler and/or heater.

Many types of cooking instruments, employing electric heating elements, particularly for broiling and frying, are known. In general, such devices fall into two catagories. The first catagory includes those more or less portable units, which are, however, housed in an enclosed oven structure accessible through a door or lid, but otherwise sealed and insulated. Such units, as disclosed in Switzerland Pat. No. 459,499 of July 15, 1968, French Pat. No. 1,485,674, French Pat. No. 1,211,831 and U.S. Pat. No. 2,230,268, retain heat and splatter but have the disadvantage that air flow and heat conductivity about the food is severely blocked. A further disadvantage lies in the fact that such units are not easily cleaned. The second catagory includes the more or less stationary or fixed units, attached to permanent ovens or ranges, being an accessory thereto. These units as seen in U.K. No. 783,533 are not only permanently fixed, but the distance from heating element to food is difficult to vary, they are difficult to clean, and further also suffer from the defect that air and heat flow is blocked.

There has also been an attempt at making very simplified devices, such as that shown in Switzerland patent disclosure No. 610,747 of May 15, 1979 wherein a heating element is mounted on a vertical rod to extend cantilevered therefrom over a pan on which the food rests.

While the heating element is vertically adjustable relative to the standard, the entire unit, including both food and heating element, is open to the air. As a consequence, poor heat and air flow exist and the heat is actually dissipated into the ambient air without concentration on the food, while fat and juices splatter freely.

It is an object of the present invention to provide an improved broiler, grill and heating unit for cooling foods which overcome the above disadvantages.

It is further an object of the present invention to provide an improved broiler, fryer and grill apparatus where the heating elements are easily removable for cleaning, easily adjustable in high and provided with a reflecting cover and sides which are adjustable so that improved air flow is provided.

These objects together with other advantages and benefits will be apparent from the following disclosure.

SUMMARY OF THE INVENTION

According to the present invention, there is provided a cooking device, comprising a base on which a pan or the like may rest; vertical standard means collapsibly secured to the base; a housing removably mounted on the standard for holding a heating element horizontally in opposition to the base; the housing being provided with a removable cover and removable flaps depending lengthwise from the sides thereof to enclose the space between the heating element and the base, preventing the escape or splattering of food, juices, fats, etc.

The apparatus is thus provided with a minimum number of parts, which parts are dismountable for complete disassembly, allowing quick and efficient cleaning cleaning and storage.

The cover and the lateral flaps are preferably formed of reflective materials and provide an open and ventilated volume for cooking, in which radiant heat losses are minimized while splashes of fats, juices, etc are prevented.

The use of removable covers and flaps has the advantages of enabling the apparatus to be easily cleaned which advantage may be further enhanced by the ability to employ a disposable aluminum foil providing increased radiation and a reduction in staining. Reflecting power can then be maximized, even with an infrared heating element to provide a substantial economy of energy. The ease in removing the cover and side flaps, and the ability to use the foil reduces otherwise tedious cleaning operations to minimum.

Full details of the present invention are set forth in the following description and are illustrated in the accompanying drawings.

DESCRIPTION OF THE INVENTION

Figure 1:
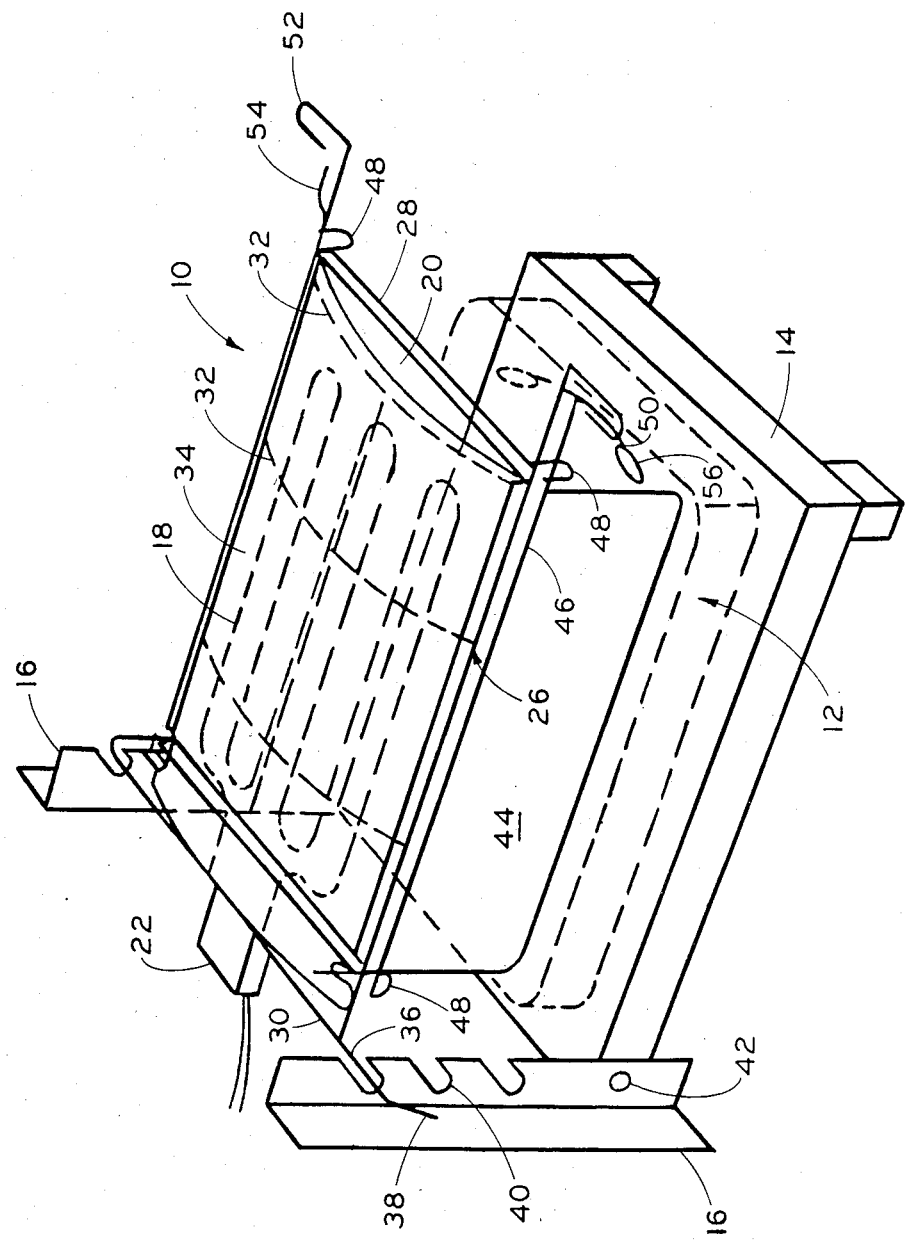
FIG. 1 is a perspective view of the cooking apparatus of the present invention.

The apparatus of the present invention, as seen in the Figures generally comprises a broiler 10, a pan 12, a base 14 for the pan and a pair of vertical angle standards 16 fixed at the rear corners of base 14.

A heating element 18 is mounted in a housing 20 so that its plug/socket 22 extending rearwardly through the standards 16. The housing is preferably formed of steel wire rods arranged as a rectangular framework, peripherally defining, in a common plane, side walls 26, a front wall 28 and a rear wall 30, over which a dome like top is formed by a plurality of transverse trusses 32. A corresponding shaped sheet 34 rests on the trusses 32 creating a dome like vault.

Extending laterally from the rear wall 30 of the housing 20 are a pair of laterally extending rod extensions 36 each bent 90° to the common plane of the framework at its end 38. The extensions 36 and the rods forming the rear wall 30, are preferably formed integrally with and from the same rod stock, are sufficiently rigid so that they remain fixed and stationary relative to the remainder of the frame. Each of the vertical standards are provided with inclined spaced notches 40 uniformly and correspondingly located in both brackets 16 so as to allow the extensions 36 to removably seat therein and permit the broiler housing to be tilted upwardly and downwardly as indicated by arrow A in FIG. 2, using the rod extension as the pivot axle.

The vertical standards are constituted by two angle brackets so as to have an L-shaped cross section, one leg being parallel to the respective side of the housing, the other leg extending laterally outward perpendicular thereto. The detent means consist of notches 40 that are set in the parallel leg of the L-shaped brackets at correspondingly uniform spacing. Preferably the standards 16 are secured to the framework by the parallel legs, through screws 42 or fast-disconnect pivot hinges, so that the standard can be easily collapsed.

After introduction of the lateral rod extensions 36 into the notches 40, the angular end portion 38 prevents the rod extension from slipping out of the notches 40 and acts to locate the housing in its proper position because the ends 38 are permanently and fixedly perpendicularly to the plane of the frame, the pivoting of the frame in its downward direction forces these ends 38 against the laterally extending legs of the standard 16, arresting further movement and limiting the downward movement of the frame to a substantially horizontal position, as seen in FIG. 1.

The housing 10 is removable from the standard 16 by merely lifting it and removing the lateral rod extensions 36 from the notches 40. The housing likewise is freely pivoted from the horizontal upwardly and may be situated in any intermediate position (such as 45°) merely by wedging the housing in place, as by placing a skewer or the like in the appropriate notch or behind the end 38 of the rod extension.

Thus, the height of the heating element may be easily adjusted above the food, and proper care of the food even during cooking as for example, basting, turning, brushing with barbecue sauce or seasonings can easily be made.

The housing is provided with a pair of adjustable side flaps 42 which are hung along the length of sides 26 of the housing frame so as be both removable and hinged to pivot in the directions of arrow B. The flaps 44 comprise an elongated rectangular sheet secured along its upper edge to a rod 46 which extends both forward and aft through U-shaped bracket 48 formed at each corner parallel with the front and rear sides 28 and 30. The brackets 48 are in fact extensions of one or both of the wire rods from which the the front and rear sides are made. The forward end of each of the flap rods 46 is provided with an integrally formed handle 50 which enables the flap to be movable from a first position in which it hangs fully downward to a second position in which it extends horizontal outward. The handle, is movable within a slotted block 52, preferably formed of wood, which limits the movement of the handle between the two extremes. A hook 54 is also provided which allows the flap 44 to be locked in its upward position. If desired, the block 52 can be slotted and provided with ratchet teeth or the like, to provide stop positions intermediate the extreme positions. The handle also is provided with a wooden knob 56. The slotted block 50 functions also as a handle by which the housing can be manipulated.

Adjustment of the flaps 44 enable the proper amount of air flow to. be established, while also functioning to concentrate heat and prevent fat and juices from escaping. The flaps 44 are easily removable from the frame for cleansing.

Figure 2:
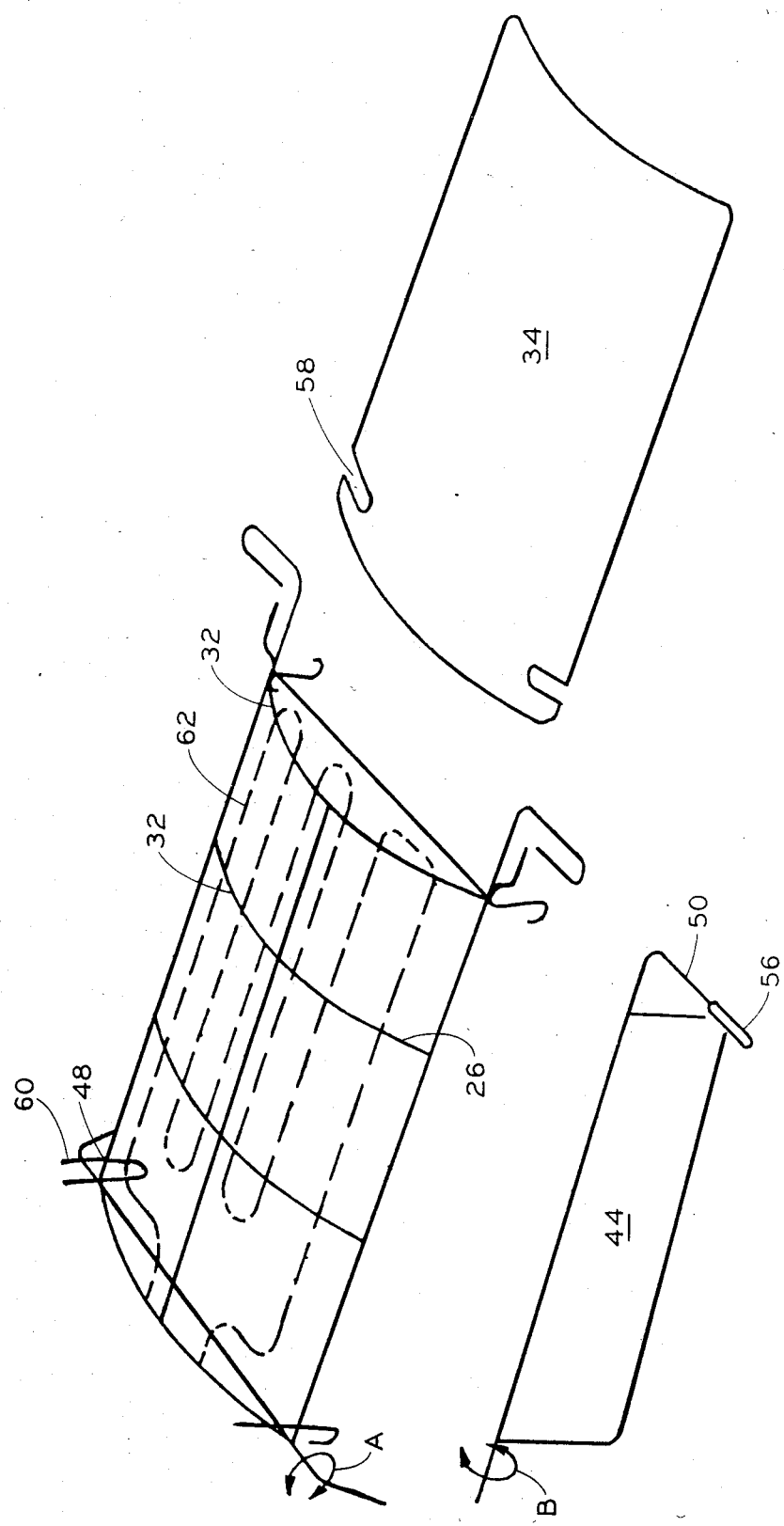
FIG. 2 is an exploded view of the housing for the heating element, showing the cover and lateral flaps.
Figure 3:
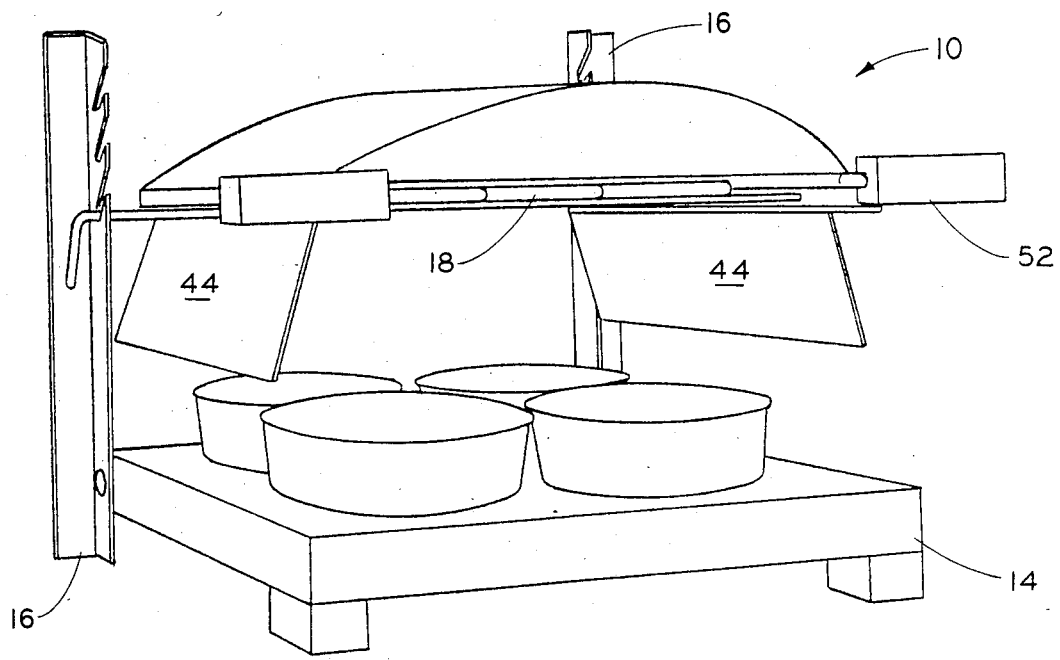
FIG. 3 is a perspective view of the apparatus from the front left corner, showing the flap in up position.
Figure 4:
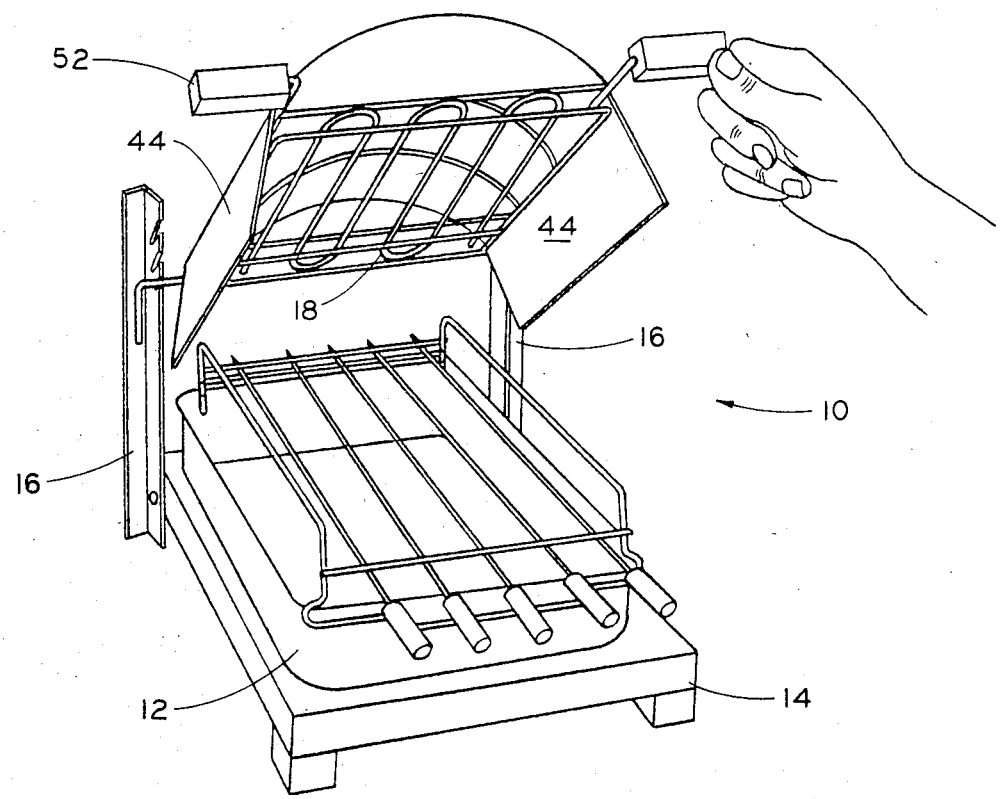
FIG. 4 is another perspective view of the apparatus.

As seen more clearly in FIG. 2, the cover sheet 34 is provided with a permanent curvature conforming to the arcuate trusses 32 and adjacent its rear end with a pair of laterally inward notches 58. These notches 58 are adapted to fit over vertical extensions 60 on the rear U-shaped brackets 48. The cover 34 is thus easily located and removable for easy cleaning. While it is prefereable that the cover 34 be pre-curved to fit over the dome, a flexible flat sheet can be used, which assumes the appropriate curve after placement on the dome.

As seen further in FIG. 2, the heating element 18 comprises a continuous high resistance electrical wire rod 62, bent in serpentine fashion to provide uniform heat across the entire area within the housing frame. However, the heating element may be an infra-red unit or one formed of two or more separate units which are separately controlled, to provide several levels of heating. High resistance heating elements, infra-red units, and control circuits, including switch means for regulating one or two or more heating elements are well known, and consequently, are not described here. Standard conventional heating elements such as electrical resistance coils, infra-red elements can all be employed. The apparatus therefore can be used for a variety of cooking modes, such as the broiling and barbecuing of meat, fish and foul to delight any refined amatuer or professional cook.

The reflecting cover 34 is according to an advantageous embodiment formed of a metal sheet, for instance, aluminum of which the surface of the concave face, facing the heating element is highly polished for better reflection of the radiant heat. It is possible to line this underside surface with a disposable metal foil of, for instance, a thin aluminum foil bent over its edges. This renders cleaning more easy as the aluminum foil when soiled may be simply discarded and replaced.

The wire rods forming the frame are preferably made of stainless steel or of a metal conveniently treated to have a surface as smooth as possible to render them easy to clean and resistant to the relatively high heat to which the rods are submitted.

The flaps 42 are also preferably formed of metal sheet, for instance, aluminum and it is also possible to cover the flaps themselves with a sheet of disposable aluminum foil.

Coming back to FIG. 1, the assembly constituting the removable housing that is to say the frame, the flaps 7 and the cover sheet can be positioned at various heights above the pan by virtue of the choice of notch 40 into which the rod extensions 38 are inserted. Choice of height depends of the nature of food to be cooked. Since the intensity of heat on the food depends largely on the distance of the heating element from the food, access to the pan, for instance, in order to baste food cooked in its juice is particularly simple as the housing can be pivoted and/or lifted into vertical position or an intermediate angular position to permit access to the pan.

Though not shown, the front and rear walls of the housing frame can be equipped with a protecting piece to avoid contact with splattered fat or juices. However, as it concerns the smaller sides of the rack, very little amount of such splatter would effect either appearance or use.

Other ways of mounting the housing on standards to permit easy lifting and positioning are possible. The standards may be provided with hook, cover which the rod like framework of the housing could be hung. The standard may have a slotted ratchet and as having a pawl engaging therein.

Any pan, dish or pot may be used to hold the food, although a very suitable pan, with a rack and curved bottom, as shown in U.S. Pat. No. 3,972,318 may be advantageously used.

As is obvious from the foregoing, the present cooking device is particularly adaptable to most cooking operations, especially broiling and/or barbecuing of meats, such as large steaks, fowl, fish, sausages, skewers; the cooking of Croque-Monsieur roasting, toasting breads and the like; making "Gratins" "Raclettes" either in individual "ramekins" or in large portions.

The apparatus is easily collapsible for storage, by merely disassembly of the vertical standards, after removal of the pan, housing and heating element.

It will thus be seen that the various objects qnd advantages ennumerated earlier for this invention have been fully met and satisfied. Various changes, embodiments and modifications have been shown and suggested and will be obvious to the person skilled in this art. Therefore, the present disclosure is to be taken as illustrative of the invention and not as limiting of its scope.

What is claimed is:

1. Cooking apparatus comprising a base for the support of a pan or the like for holding food, vertical standard means removably secured to said base and a housing substantially coextensive with said base and having a heating element located therein, said vertical standard means having detent means spaced along its length, and said housing having means enterable into and cooperating with said detent means to hang said housing on said standard in a selected one of said detent means at a selected angle to the horizontal, said housing being thus mounted on said standard means for vertical adjustment in a selected one of said detents and for selected pivotal movement about a horizontal axis corresponding to the adjusted position whereby said heating element is adjustable in use, in height and angular relationship to said base, said housing comprising an open framework in which said heating element is located and a removable cover located on said framework above the heating element provided with a reflective lower concave surface to focus the heat from said heating element inwardly from the sides of said housing and pivotal flaps removably mounted along the exterior sides of said housing, said flaps and said housing having cooperating means for selectively positioning said flaps to depend into the vertical space between said housing and the base and to permit angular adjustment of said flaps relative to said housing to provide a variable wall opening about said apparatus.

2. The apparatus according to claim 1, wherein the framework of said housing is formed of elongated rod members integrally secured in a common plane to provide peripheral front rear and side walls, and rod trusses forming a dome thereover on which said cover rests.

3. The apparatus according to claim 2, wherein said vertical standard means comprises a pair of spaced posts each having a plurality of uniformly disposed inclined notches, said frame being hung in selected corresponding notches of said posts.

4. The apparatus according to claim 1, wherein said posts are formed of angle bracket having an L-shaped cross secton in one leg of which said notches are formed, and the rear of said framework is provided with laterally extending rods adapted to fit in said notches, said rods being formed wih ends bent at 90° depending from the common plane and adapted to engage the other leg of said L-shaped bracket whereby said housing may be pivoted upwardly about the axis of said rod extensions and be limited in the downward direction by the engagement of said bent end with said other leg.

5. The apparatus according to claim 4, including handle means at the front of said framework.

6. The apparatus according to claim 1, wherein said housing is provided with hook means along the sides thereof, and said flaps are provided with hangar means adapted to be removable received in said hooks permitting pivoting of said flaps.

7. The apparatus according to claim 6, wherein said hooks have portions extending upwardly from the sides of said framework, and said cover is provided with notches locatable about said upwardly extending portions to be removably anchored thereon.

* * * * *